Jan. 27, 1970  T. ARNESEN  3,492,477
METHOD AND APPARATUS FOR EXAMINING HOLLOW BODIES
Filed Feb. 28, 1966  9 Sheets-Sheet 1

Inventor
Tore Arnesen
Stevens, Davis, Miller & Mosher
Attorneys

Jan. 27, 1970  T. ARNESEN  3,492,477
METHOD AND APPARATUS FOR EXAMINING HOLLOW BODIES
Filed Feb. 28, 1966  9 Sheets-Sheet 8

Inventor
Tore Arnesen
Stevens, Davis, Miller & Mosher
Attorneys

United States Patent Office 3,492,477
Patented Jan. 27, 1970

3,492,477
METHOD AND APPARATUS FOR EXAMINING HOLLOW BODIES
Tore Arnesen, 874 Philip St., Sarnia, Ontario, Canada
Filed Feb. 28, 1966, Ser. No. 530,456
Int. Cl. G01n 21/34
U.S. Cl. 250—65                                9 Claims

ABSTRACT OF THE DISCLOSURE

The present invention relates to an improved machine for the radiological inspection of circumferential welds in a pipeline. Machines are known which can travel along the inside of a pipeline and which stop at each circumferential weld and after stopping expose that weld to radiographic rays to produce a suitable image on a photographic film wrapped around the outside of the pipe and encircling the weld. Such machines are commonly driven by an electric motor energized through power cables extending along the pipeline and dragged along by the travelling machine. According to the present invention, the machine includes an electric propulsion motor, and an electric battery arranged to energize that motor, the arrangement being such that the battery remains in an upright position as the carriage passes through the pipe, despite the natural inclination of the machine to rotate as it passes through the pipe.

---

Figure 1:
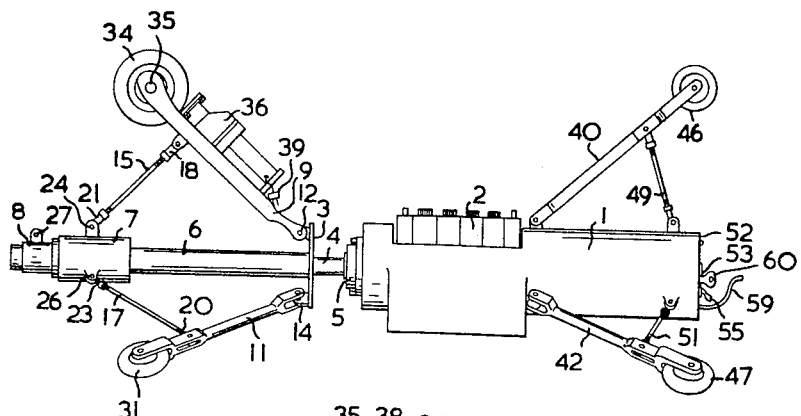

The present invention relates to a method and apparatus for examining circumferential welds in pipes.

Previous examination of cylindrical metal pipes, particularly in the radiographing of a weld, has necessitated the insertion of a type of probe into one end of the pipe, said probe being controlled from a control station outside the pipe through mechanical or electrical connections. This is, of course, a considerable disadvantage particularly when a long pipe is under examination.

An object of the present invention to provide apparatus which may be used for examining a pipe and in which the above-mentioned disadvantage is substantially reduced or obviated.

Accordingly there is provided apparatus for inspecting welds or the like in hollow bodies to determine characteristics thereof wherein such apparatus includes the improvement comprising a carriage for supporting a source of penetrating rays and for transporting the source along the inside of a hollow body, drive means for propelling the carriage through the hollow body, a power source for supplying operating power to said drive means, said drive means and power source being mounted on the carriage, sensing means on the carriage for stopping movement of the carriage adjacent a part of the hollow body, control means responsive to said sensing means to position said source adjacent said part and to expose said part to penetrating rays from the source.

The present invention also provides apparatus for examining a hollow body by passing penetrating rays from a source through a part of the hollow body to form an image thereof on recording means, said source and said recording means being located one on the inside and the other on the outside of said hollow body, said one being mounted on a carriage for movement through the hollow body, drive means for propelling the carriage through the hollow body, a power source for supplying operating power to said drive means, said drive means and power source being wholly contained on said carriage, sensing means on the carriage for stopping said movement of the carriage adjacent said part of the hollow body to be examined, whereby penetrating rays from said source pass through said part to said recording means whereby the characteristics of said part can be determined.

From another aspect it is an object to provide a method which may be used for examining a pipe and in which the above-mentioned disadvantage is substantially reduced or obviated.

Accordingly there is provided a method of radiographing a weld in a hollow body which comprises the steps of positioning a film over said weld on the outside of said body, locating a transportable unit of radiation energy on the outside of said hollow body adjacent said weld, passing a supporting carriage for a source of penetrating rays through the inside of said hollow body, causing sensing means on said carriage to respond to said radiation energy to stop the carriage adjacent said weld, positioning said source adjacent said weld and exposing said film to the penetrating rays from said source.

Figure 2:
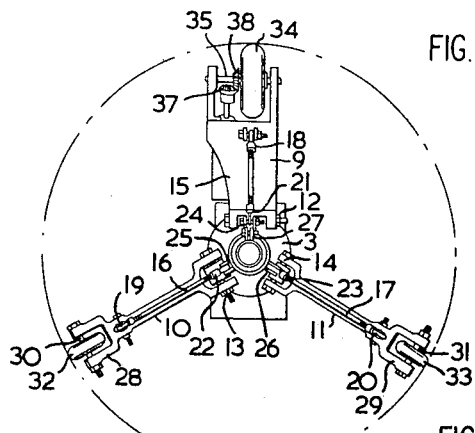
Figure 3:
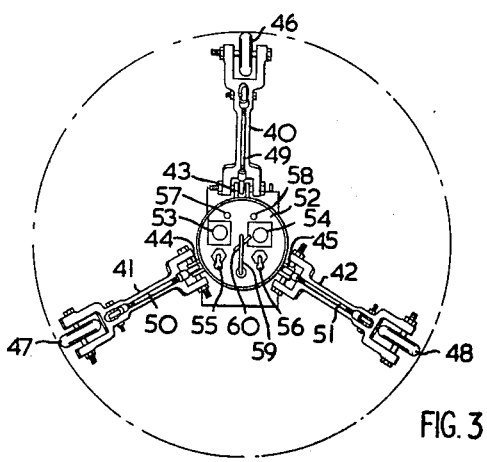
Figure 4:
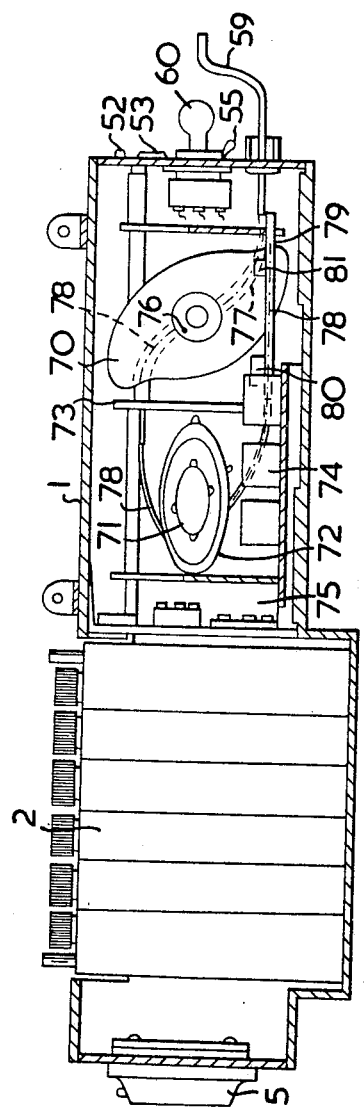
Figure 5:
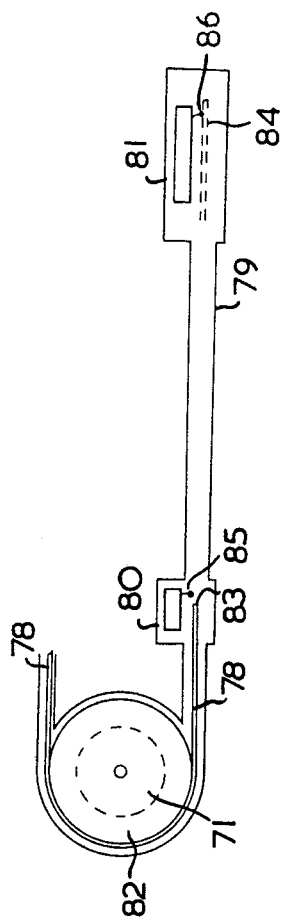
Figure 6:
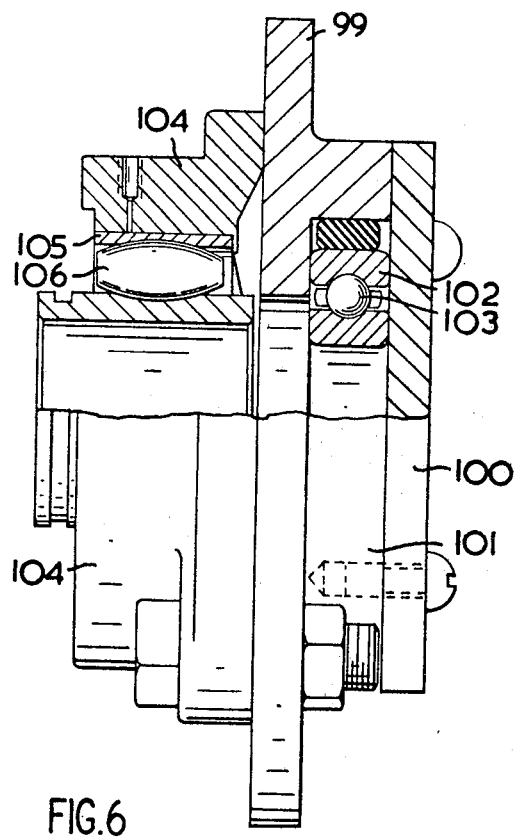
Figure 7:
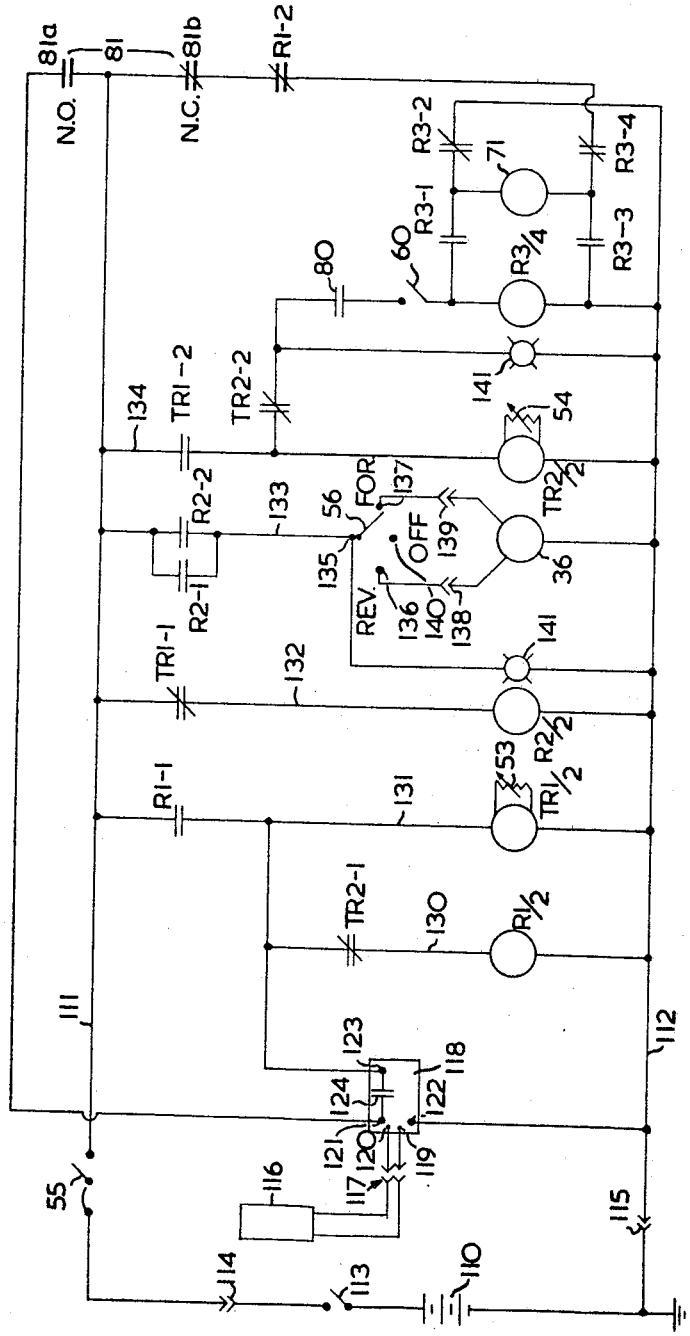
Figure 8:
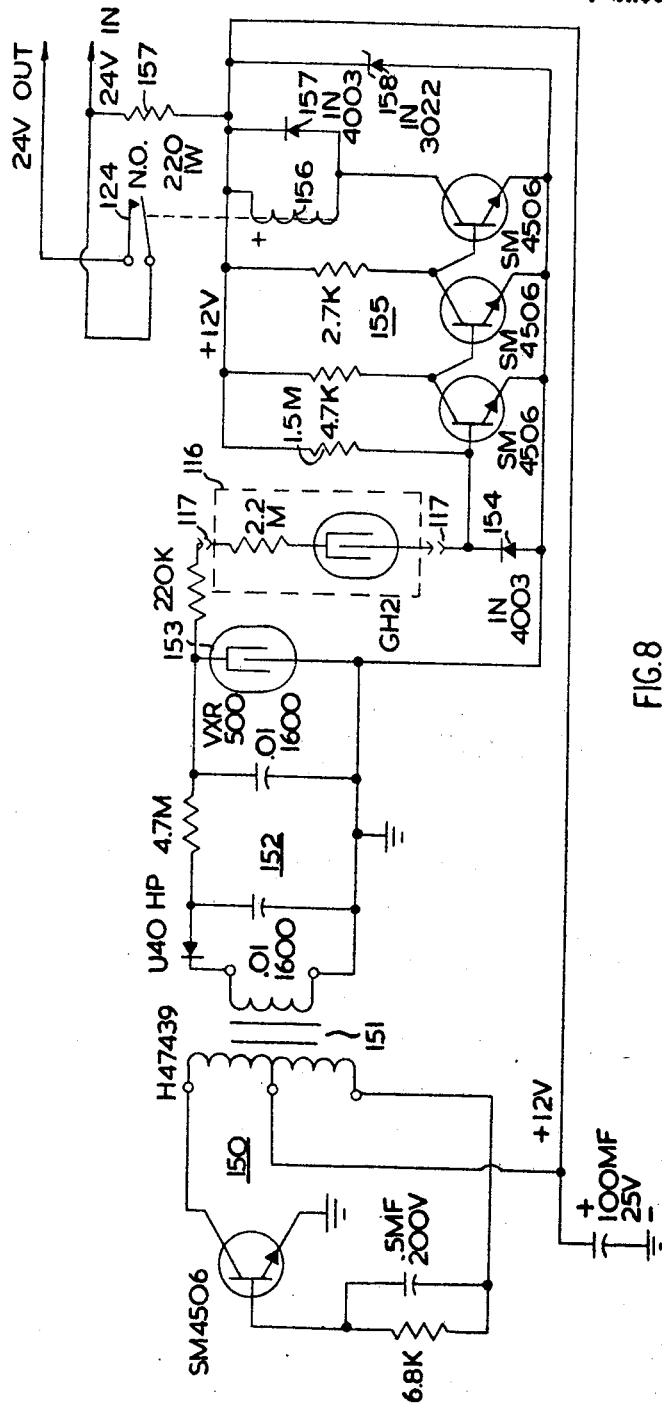
Figure 9:
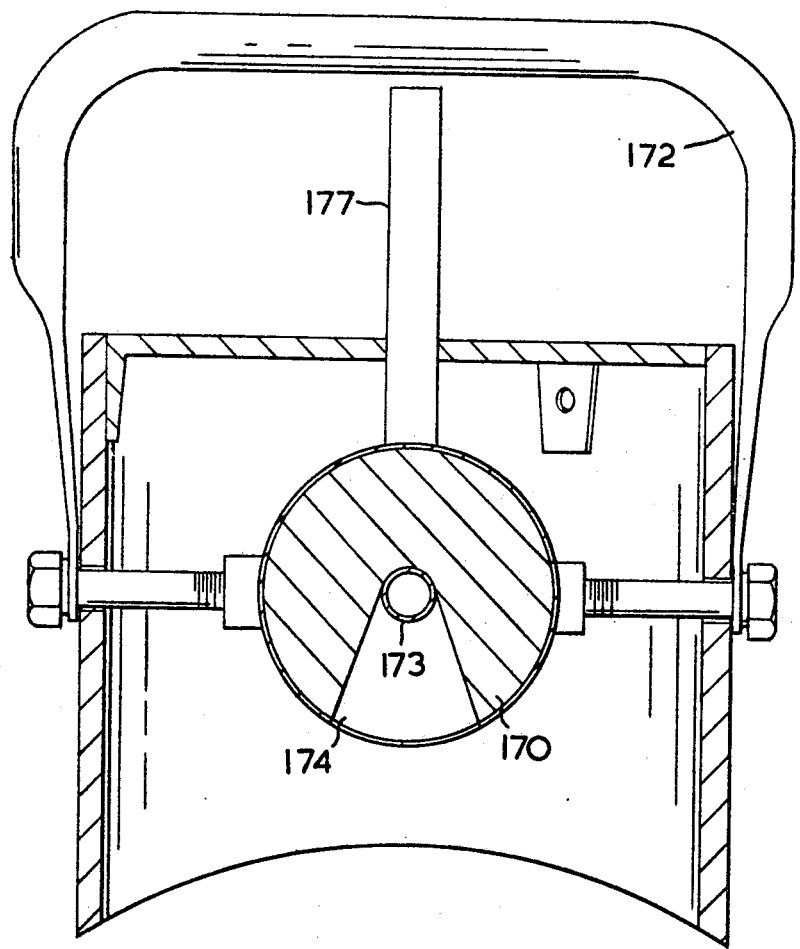
Figure 10:
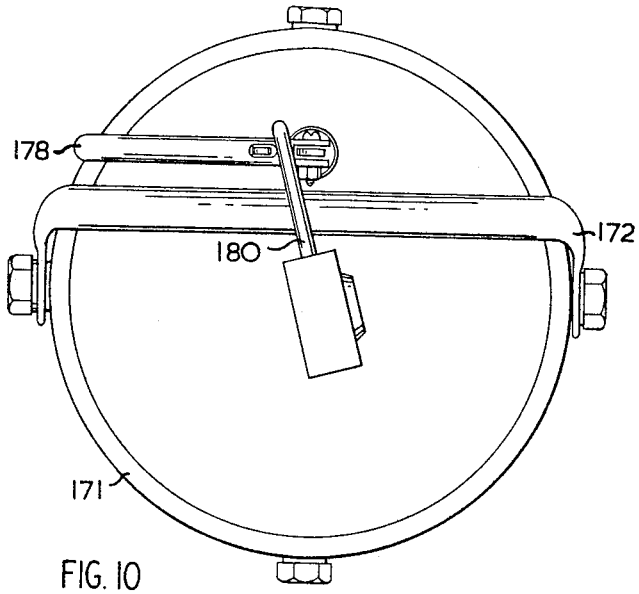
Figure 11:
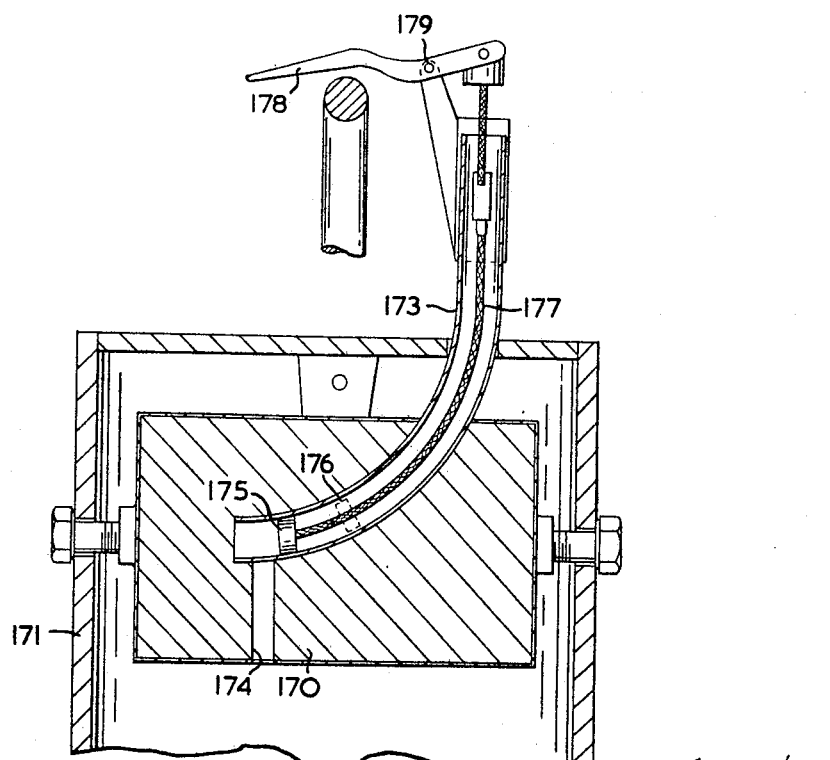
Figure 12:
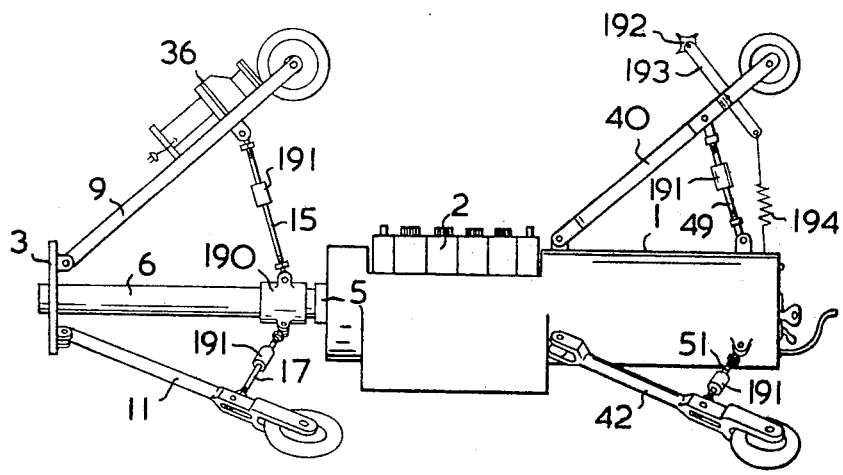

The invention will now be described, by way of example, with reference to the accompanying drawings in which:

FIGURE 1 is a diagrammatic representation of an inspection machine according to the present invention, constituting an appaartus for examining pipes, FIGURE 2 is a front view of the machine illustrated in FIGURE 1, FIGURE 3 is a rear view of the machine illustrated in FIGURE 1, FIGURE 4 is a side view, partly in section, of the main body portion of the machine illustrated in FIGURE 1, FIGURE 5 is a diagrammatic representation of part of FIGURE 4, on an enlarged scale, FIGURE 6 is a representation, partly in section, of the bearing unit 5 of FIGURE 1, FIGURES 7 and 8 show the control circuits for the inspection machine, FIGURE 9 is a view, partly in section, of a portable radiation source, FIGURE 10 is a plan view of the portable source of FIGURE 9, FIGURE 11 is a side view, partly in section, of part of the portable source illustrated in FIGURE 9, and, FIGURE 12 is a diagrammatic representation of a modified form of inspection machine according to the present invention.

The machine illustrated in the figures is designed for the detection of welds in pipes and the examination of those welds by means of rays emitted from a radioactive source mounted on the machine, said rays passing through the weld and being incident on a film wrapped around the weld on the outside of the pipe. In this manner it is possible to determine the characteristics of the weld and to locate a detectable fault therein.

The machine comprises a carriage, the first part of which is a main housing 1 for containing the electrical and electronic components which control the operation of the machine. A power source in the form of a battery 2 for supplying power to operate the machine is shown in FIGURE 1 mounted on the main housing 1. A second part of the carriage includes a front support plate 3 which is attached, through a shaft 4, to a second part of a universal joint unit 5, the first part of which is mounted on the main housing 1. The plate 3 carries a forwardly extending shaft 6 on which is mounted a suspension spring unit 7 and a spring detainer unit 8. With this arrangement the main housing 1 can remain upright while the second part of the carriage rotates in a pipe along which the carriage moves.

Three runner legs 9, 10 and 11 are pivotally mounted at 12, 13 and 14 on the plate 3, as shown in FIGURES 1 and 2. Each runner leg is provided with a respective adjustment rod 15, 16 or 17, one end of which 18, 19 or 20 is pivotally secured to the respective support leg 9, 10 or 11. The respective other end 21, 22 or 23 of each adjustment rod 9, 10 or 11 is pivotally mounted on the suspension spring housing which is, for this purpose, provided with support brackets 24, 25 and 26 as shown in FIGURES 1 and 2. The spring detainer 8 is also provided with a support bracket 27 for the mounting thereon of ancillary equipment, for example, a feeler arm supporting a feller wheel to be described later.

Each of the runner legs 10 and 11 is so shaped as to have a central stem and a U-shaped section at each end. The U-shaped sections at one end of the runner legs 10 and 11 are, as shown in FIGURE 2, respectively utilized to pivotally mount the legs 10 and 11 on the brackets 25 and 26. The outer other ends 28 and 29 of legs 10 and 11 are also U-shaped and a respective axle 30 or 31 is provided between the two branches of the respective U-shaped end. A runner wheel 32 is freely rotatable on the axle 30 whilst a runner wheel 33 is freely rotatable on the axle 31 so that when the inspection machine travels along the inside of a pipe then the wheels 30 and 31 run along the internal surface thereof.

As will be clear from FIGURES 1 and 2, the runner leg 9 is of stronger construction than, and of a different shape to, the runner legs 10 and 11 so as to carry a drive wheel 34 mounted on a drive axle 35. The drive wheel 34 is driven by an electric drive motor 36, mounted on the runner leg 9, through a pair of meshing bevel gears 37 and 38 (FIGURE 2). Power to operate the drive motor 36 may be supplied by connecting the battery thereto by way of power plug 39.

The main housing 1 is provided with three runner legs 40, 41 and 42 which are of the same shape as the runner legs 10 and 11, each having two U-shaped ends as shown in FIGURE 3. Each of the runner legs 40, 41 and 42 is pivotally mounted on a respective support bracket 43, 44 or 45 and at its outer end is provided with a freely rotatable runner wheel 46, 47 or 48. Corresponding adjustment rods 49, 50 and 51 are provided for the runner legs 40, 41 and 42. A control panel 52 is provided at the rear end of the main housing and carries two potentiometer controls 53 and 54, a circuit breaker and toggle switch 55 and a three-way toggle drive switch 56 (FORWARD-OFF-REVERSE) as shown in FIGURE 3, and two warning lights 57 (a so-called "travel or drive lamp") and 58 (a so-called "source lamp"). A radioactive source exposure tube 59 extends through the control panel 52 which is provided with a source switch key 60 to ensure that the source can be locked in a safe position when not in use.

In one machine which was constructed according to the present invention the overall length of the machine was 4′11″ and the runner legs were such that the machine could operate satisfactorily in a pipe having an internal diameter of 3′6″.

In FIGURE 4 there is shown a view, partly in cross-section, of the main housing unit 1 of FIGURE 1. Like numerals are used to identify like parts in FIGURES 1 and 4. The battery 2 and spheriseal pivotal bearing unit 5 can be clearly seen in FIGURE 4, as well as the exposure tube assembly 59. The housing 1 also contains a depleted uranium ball assembly 70 associated with the exposure tube 59. A Teleflex (registered trademark) remote control motor 71 is also visible in FIGURE 5, as well as the Teleflex remote control unit 72, the motor 71 and the control unit 72 being separated from the depleted uranium ball assembly 70 by means of a Bakelite partition 73. (Bakelite is a registered trademark of Bakelite corporation). Relay units 74, and a transistorized unit 75 are also visible in FIGURE 4 and will be described later in greater detail.

The Teleflex remote control unit 72 is adapted to move a radioactive source 76 from a safe storage position within the depleted uranium ball assembly, as shown in FIGURE 4, to an irradiating position at the outside extremity of the exposure tube 59, external to the main housing. This radioactive source can be any of the sources commonly used for radiography, for example it can be a source of gamma radiation or X-rays such as iridium 192, cobalt 60 or caesium 137, all of which are known materials used in the examination of welds. The control unit includes a Bowden type cable (Bowden is a registered trademark) having an outer sheath 77 forming part of the exposure tube with an inner cable 78 movable therein. The radioactive source 76 is attached to one end of the inner cable 78 which is of a metallic spiral construction so a toothed gear wheel driven by motor 71 can engage therewith to move the inner cable 78 and thus the source 76. The inner cable 78 passes through the teleflex remote control unit 72 and its other end is movable within a tube 79. Mounted on the tube 79 are control switches 80 and 81 having feeler operating arms extending into the tube 79 and operable by the end of the inner cable 78 to switch the drive motor 71 on or off. This can be seen more clearly in FIGURE 5 which is a diagrammatic representation of this part of the machine on an enlarged scale.

In FIGURE 5 the inner cable 78 is driven by the motor 71 via a toothed gear wheel 82 and its other end 83 is shown in a position corresponding to the source 76 (FIGURE 4) being in the irradiating position. When the source 76 is in its storage position, then said other end 83 assumes the position 84 shown by broken lines in FIGURE 5. When the machine stops at a weld, as explained later, and the motor 71 operates to move the source 76 from a storage to an irradiating position then the other end 83 of the inner cable travels towards the position shown in FIGURE 5. Switch 81 is ineffective during this movement but as end 83 passes switch 80, it allows the respective switch operating arm 85 to assume a substantially vertical position and operate the switch 80. This operates to interrupt the supply of voltage to the Teleflex remote control drive motor 71, see FIGURE 7. After the source has been in an exposed irradiating position for the required exposure time, the motor 71 is automatically re-connected by timing means (not shown) to the supply voltage, as explained later, and operates to move the radioactive source on the one end of cable 78 from the irradiating position to the storage position. The other end 83 of the inner cable 78 at the same time moves toward the position 84. Due to this movement the operating arm 85 of switch 80 is moved from a substantially vertical to a more horizontal position. The switch 80 is therefore re-set but this is of no effect on the motor, as will be clear from FIGURE 7. However, when the end 83 passes the control switch 81 it moves the respective switch operating arm 86 from a substantially vertical to a more horizontal position. Switch 81 then operates to switch off the supply voltage to the source motor 71 which thus stops with the radioactive source 76 in its storage position within the uranium ball assembly, FIGURE 4, and said other end of the inner cable 78 in the broken line position 84, FIGURE 5.

Although tube 79 has been shown as relatively straight, it will be appreciated that it may be flexible and may, if necessary, extend around the depleted uranium ball assembly and be fastened to the upper part of the main housing 1. In such a case, the control switch 81 may be mounted on the upper part of the main housing 1 in FIGURE 4.

The universal joint unit 5 is shown in FIGURE 6 partly in cross-section. The first part of the unit includes a back-up plate 100 and a ball bearing housing 101 for attachment to the main housing unit 1 of the inspection machine. The ball bearing cage 102 containing the actual ball bearings 103 is clearly visible in FIGURE 6. The second part of the unit comprises a roller bearing housing 104 having a roller bearing cage 105 with roller bearings 106. When assembling the inspection machine the shaft 4 of the machine (FIGURE 1) is arranged with the roller bearing cage 105 therearound so that, when the inspection machine is moving down the inside of a pipe, the roller bearing unit and the ball bearing unit cooperate so as to permit pivotal movement of the shaft 4 with respect to the main housing 1. In this way the machine can negotiate curves and bends in a pipeline.

The components making up the control circuits for operating the inspection machine are all contained within the machine and these control circuits will now be described with reference to FIGURES 7 and 8.

As has been stated above, the machine is designed to pass along the inside of a pipeline, such as an oil or gas pipeline, to proceed down the length of the pipeline until it arrives at the location of a weld joining two lengths of pipeline together or some similar irregularity or part of the pipe to be examined. The location of the weld may be detected by a feeler wheel, to be described later, or alternatively a portable source of radiation may be positioned opposite the respective weld on the outside of the pipe. A detection device, such as a Geiger Mueller tube is then provided on the inspection machine so as to be responsive to radiation from the portable source. The inspection machine is then controlled to travel a further small distance until the exposure tube 59 (FIGURE 1) is opposite the weld to be inspected. The supply voltage to the drive motor 36 is then disconnected and a source motor is operated to move the radioactive source from 76 its storage position to its irradiating position. A timing device is effective to initiate retraction of the radoactive source back to its storage position after the required exposure has taken place to provide an image of the respective weld on a film which has previously been wrapped around the outside of the weld. The supply voltage is reconnected to the drive motor 36 and the inspection machine proceeds down the inside of the pipeline to the next weld where the sequence of operations is repeated. In this manner a film record is obtained for each weld and from this the characteristics of the respective weld may be determined in order to locate any faults therein.

With reference to FIGURE 7, it will be seen that this includes a 24-volt battery 110 for supplying voltage between a positive line 111 and a negative line 112 through the circuit breaker 55, and a front end switch 113 and two contact connections 114 and 115, these may, in practice be the plug 39. The front end switch 113 is so called because it is located on the machine at the opposite end to the instrument panel and adjacent to the drive motor 36 (FIGURE 1) so as to facilitate the switching off of the machine from either end.

In FIGURE 7 a Geiger Mueller tube is indicated as 116 and is connected through a pair of contacts 117 to a Geiger Mueller panel 118 which includes the further control circuit of FIGURE 8 associated with the terminal points 119, 120, 121, 122 and 123. A normally open contact 124 is connected between the terminals 121 and 123 and is capable of being closed in response to energization of the Geiger Mueller tube (FIGURE 8). The limit switch 81 of FIGURE 5 controls two contacts, one normally open contact 81a which is connected between voltage supply line 111 and terminal 121, and a further switch contact 81b which is normally closed and is connected as shown in FIGURE 7. When the radioactive source is in the irradiating position in exposure tube 59, then the switch contacts 81a are open and the switch contacts 81b are closed.

The circuit in FIGURE 7 includes a number of sub-circuits or lines 130, 131, 132, 133 and 134 in which are connected various relay coils, relay contacts and motors. A line is also connected between terminal 122 on the Geiger Mueller panel 118 and the common grounded line 112.

For simplification in considering FIGURE 7, the number of contacts controlled by each relay is indicated adjacent the respective relay in FIGURE 7. For example, relay R1 controls two contacts (R1–1 and R1–2) and therefore this relay is indicated as R1/2. Relays indicated by the letters TR are time delay relays which are designed to operate their respective contact a delayed time after the application of voltage to the relay coils.

Line 130 includes the relay R1 in series with a normally closed contact TR2–1 of timing relay TR2 and is connected between the ground line 112 and terminal 123 which is also connected to the junction, in line 131 of normally open contact R1–1 of relay R1 and a delay time relay TR1. The potentiometer control 53 (FIGURE 3) is effective to adjust the associated potentiometer 53A (FIGURE 7) connected across timing relay TR1 to permit adjustment of the time control thereof. Line 132 includes a relay R2 and a normally closed contact TR1–1 of relay TR1 whilst line 133 includes a pair of relay contacts R2–1 and R2–2 connected in parallel for current reasons and connected between the positive line 111 and common terminal 135 of the drive switch 56 (REVERSE-OFF-FORWARD) of FIGURE 3. The drive motor 36 is connected between ground line 112 and reverse terminal 136 and forward terminal 137 by way of contacts 138 and 139. The switch 56 also includes a neutral OFF position 140 whilst a drive indicator lamp 141 is connected between the common terminal 135 and ground 112. Line 134 includes a normally open contact TR1–2 of time delay relay TR1 in series with a time delay relay TR2 across which is connected a potentiometer associated with the potentiometer control 54 of FIGURE 3. One side of the safety lock switch 60 (for use on test) of FIGURE 3 is connected to the junction of timing relay TR2 and contact TR1–2 as shown in FIGURE 7 through a normally closed contact TR2–2 of time delay relay TR2 and the out limit switch contact 80 which as shown in FIGURE 4 is operative in response to movement of the inner cable when the radioactive source is moved to its OUT position. A relay R3 is connected between switch 60 and ground and controls the condition of four contacts R3–1, R3–2, R3–3 and R3–4 which determine the direction of rotation of the source motor 71 to either move the radioactive source of FIGURE 7 from its storage to its irradiation position or from its irradiating position to its storage position. It will be seen that a source exposure indicating lamp on 41 is connected between ground and the junction of OUT limit switch 80 and normally closed relay contact TR2–2 to indicate when the radioactive source is in its exposed irradiating position.

The Geiger Mueller tube 116 is shown in circuit in FIGURE 8 and is adapted to respond to the outside portable source. It may in fact be any kind of tube which ionizes to conduct in response to an outside portable source. FIGURE 8 shows the associated control circuit which is mounted on the Geiger Mueller panel 118 of FIGURE 7. The circuit includes a transistor oscillator circuit 150 which supplies an output through a stepup transformer 151 at approximately 600 volts, 1 K/cs. per second to a rectifier/filter network 152. A regulator neon tube 153 is connected across the network 152 to supply a regulated voltage of 500-volt through resistors to the Geiger Mueller tube 116 in series with a rectifier 154. When the Geiger Mueller tube is operated in response to the external portable source a voltage is developed across the rectifier 154 and is fed to a transistor amplifier circuit 155 which then supplies current to relay coil 156 to cause it to close the contact 124 (FIGURES 7 and 8). In this way the voltage supply from the battery 110 of FIGURE 7 is connected to the terminal 113 on the Geiger Mueller panel 118. It is to be observed that a resistor 157 is connected from the 24-volt IN line of FIGURE 8 to the amplifier circuit and oscillator circuit of FIGURE 8 so that these circuits can function no matter what the setting of the relay contacts 124. A Zener diode 158 is connected across the DC voltage applied to the three transistor amplifier circuit 155 and a diode 159 is connected across the relay coil 156 to suppress back-EMF transients and thus protect the transistors.

The portable source of radiation energy as illustrated in FIGURES 9, 10 and 11 will now be described. This portable source is of course required to be of such construction that it can be carried from weld to weld and placed on the outside of the pipes. Once on the outside of the pipe, adjacent to a weld to be examined, then the small source contained within it is moved from a safe storage position to an irradiating position so that radiation can be emitted from the portable source unit and can activate the Geiger Mueller tube 116 of FIGURE 7. Therefore, the portable source unit comprises a main body 170 of lead or some similar shielding material supported on a frame 171 which carries a handle 172 for convenience in transporting the transportable source unit. A guide tube 173 passes through the main body 170 substantially to the axis thereof and a passageway 174 is provided extending from the tube 173 to the exterior of the main lead body 170. A small radiation source, for example a weak radioactive source, is movable in the guide tube 173 between an irradiating position opposite the passageway 174, whereby radiation is emitted from the radiation source through the wall of the guide tube and out through the passageway 174, and a safe storage position 176. To facilitate movement of the small radiation source 175 it is attached to one end of a teleflex cable 177, the other end of which is connected to a lever arm 178 which is pivotable about a pivot pin 179 so as to move the source between its safe storage position and its irradiating position.

In FIGURE 10 a locking mechanism 180 is shown whereby the lever arm 178 can be locked in such a position that the small radiation source 175 is in its storage position 176. In this manner the possibility of harmful radiation reaching an operator is reduced.

In FIGURE 12 there is illustrated a modified form of the inspection machine of FIGURE 1. The inspection machine in FIGURE 12 is considerably shorter than the inspection machine of FIGURE 1 and it will be seen that the shafts 4 and 6 have been replaced by a single shorter shaft 6 having a common axis with the carriage and carrying the plate 3 on which are mounted the runner legs 9, 10 and 11. However, it will be observed that the runner legs 9, 10 and 11 are reversed in that they extend towards the main housing 1 instead of away from the housing. Thus all the runner legs extend in the same axial direction. The adjustment rods 15, 16 and 17 extend between the respective runner legs and a central support 190 mounted on the shorter shaft 6, but if desired, brackets may be provided on the main housing 1 for pivotally mounting the respective ends of the adjustment rods 15, 16 and 17 thereon. In this case the support 190 would not of course be required.

The adjustment rods 15, 16, 17, 49, 50 and 51 in FIGURE 12 are of modified construction in that they are each provided with a mechanical springer hydraulic damper arrangement 191. Furthermore, the bearing unit 5 does not consist of the spheriseal bearing unit of FIGURE 1 but instead comprises a simple ball bearing unit similar to the ball bearing housing 101 of FIGURE 6 and without the roller bearing housing. The ball bearing housing of FIGURE 12 is different however, in some respects, particularly in that the flange 99 of FIGURE 6 is on the other face of the ball bearing housing so as to facilitate the mounting of the ball bearing housing on the main housing 1 of the embodiment of the inspection machine shown in FIGURE 12.

The inspection machine in FIGURE 12 also includes a feeler wheel 192 mounted for rotational movement on the end of a feeler arm 193. The feeler arm is itself pivotally mounted on the runner leg 40 and is biased outwards away from the main body 1 by a spring 194.

When the machine is travelling along the inside of a pipeline the wheel 193 is thus urged into rubbing contact with the inner surface of the pipeline. As the feeler wheel comes into contact with a weld between two sections of the pipeline, it will be rotated through 90 degress and may be arranged to thus operate a micro-switch (not shown). Operation of this micro-switch may be utilized in place of the Geiger Mueller tube 116 of FIGURE 8 to cause the relay contact 124 to close. In this way there is no necessity for an operator to locate the portable radiation unit of FIGURES 9, 10 and 11 on the outside of the pipeline adjacent any weld to be examined. Instead the machine itself responds to each weld.

To use the inspection machine in the field to inspect welds joining sections of pipeline together, an operator wraps a recording film around each weld down the length of the pipeline and then positions, before and adjacent the first weld, a portable source unit in accordance with FIGURES 9, 10 and 11 (if one is to be used in place of the feeler wheel 192 of FIGURE 12). He then inserts the inspection machine into the pipeline at one end so that it can travel through the inside thereof.

The operator ensures that a fully charged battery 2 is used and connects the battery and drive motor 36, via plug 39, in circuit. He then sets the timing control 53 of FIGURES 3 and 7 so that the timer relay TR1 is adjusted for the time required for the inspection unit to travel from the portable radiation source outside the pipe to a location in which the end of the exposure tube 59 is in the correct position for forming a true image of the weld on the film when the radiation source 76 is in its irradiating position. The timing control 54 (FIGURES 3 and 7) is similarly set to control the timing relay TR2 to thus control the time the radioactive source 76 remains in its irradiating position before being retracted to its storage position. The drive switch 56 is now set to the OFF position (terminal 140 of FIGURE 7) and the front end switch 113, FIGURE 7, is closed as well as the circuit breaker 55. The relay is thus energized to close the contacts R2-1 and R2-2 and the drive lamp 141 will be illuminated.

The operator then adjusts the pressure on the runner legs with the inspection machine in the pipe, if necessary using the drive switch 56 (REVERSE-OFF-FORWARD) to facilitate moving of the inspection machine in and out of the pipe during adjustment. After adjustment the drive switch 56 is returned to the OFF position. The operator can then, if he so desires, bring the portable radiation source along the pipe towards the inspection machine until the Geiger Mueller tube 116 senses the portable radiation source. The setting of the control 53 for the timer relay TR1 can then be checked by noting the time which elapses before the drive light 141 goes out, indicating that the supply to the drive motor via switch 56 has been disconnected (because of the opening of contact TR1-1, the deenergizing of relay R2 and consequential opening of contacts R2-1 and R2-2).

The setting of timer relay TR2 should also be checked so that the time of exposure of the source in its irradiating position in tube 59 can be pre-set. The time will be indicated by the illumination of the source lamp 141.

After the operator is satisfied that the inspection machine is functioning properly then he can insert the key 60 (FIGURE 3) and turn it to the operating position to close safety switch 60 of FIGURE 7. He will also move the drive switch 56 to the forward position (terminal 137 of FIGURE 7) so that the inspection machine is now ready to travel down the inside of the pipeline. The portable radiation source is, of course, moved back so that it is the correct distance ahead of the weld to be inspected to energize the Geiger Mueller tube 116 at the correct time. The inspection machine travels down the inside of the pipeline until the Geiger Mueller tube 116 senses the radiation from the portable radiation source on the outside of the pipe. When this happens the circuit is completed in FIGURE 8 between the oscillator 150 and the amplifier 155 and this results in energization of relay 156 and the closing of contact 124.

Since the radiation source 76 is in its storage position the normally open contact 81a is closed (FIGURE 7) and 81b is open. Therefore, the closing of the contact 124 by relay 156 applies a 24-volt voltage from battery source 110 to the relay R1 and also to the timing relay TR2. Thus relay contact R1–1 is closed immediately and the timing relay commences its timing cycle during which the inspection machine should move forward a further small distance until the exposure tube 59 is opposite the weld to be inspected. At the end of its timing period relay TR1 opens the contact TR1–1 and closes TR1–2. Relay R2 is thus de-energized to open the contacts R2–1 and R2–2 and disconnect the voltage supply from the drive motor 36 which thus stops to halt the inspection machine. Since relay contacts TR2–2, "IN" limit switch 80 and switch 60 are closed, the closing of relay contact TR1–2 is effective to energize relay R3 to connect the voltage supply with the correct polarity to drive the source motor 71 to move the radioactive source 76 (FIGURE 4) from its storage to its irradiating position. Energization of relay R3 is, in fact, effective to close contacts R3–1 and R3–3 and to open contacts R3–2 and R3–4 which effectively connects the drive motor 71 in parallel with the relay R3.

The inner cable 78 moves the radioactive source 76 to its irradiating position in the exposure tube 59 and at the instant it arrives there the end of the inner cable 78 passes the switch operating arm 85 of the "OUT" limit switch 80 and the operating arm 85 therefore assumes a substantially vertical position to open the contacts 80 of the "OUT" limit switch (FIGURE 7) and thus disconnect the voltage supply from the drive motor 71 which therefore stops to halt the radioactive source in its irradiating position. The source exposure interval is controlled by the time delay relay TR2 and at the end of its time delay it is energized to open contact TR2–2 and thus isolate the relay R3, the source lamp 141 and the source motor 71 from the voltage supply battery 110. The source motor 71 is now connected through the closed contact R3–2 to the ground line 112 and is connected through the closed contact R3–4 to the contact R1–2. Energization of the relay TR2 at the end of the exposure time period causes the relay contact TR2–1 in line 130 to open thereby de-energizing relay R1. Therefore, the normally closed contact R1–2 reverts to its closed position thus connecting the source motor 71 across the voltage supply lines 111 and 112 but in the reverse condition so that the motor 71 runs in such a direction as to withdraw the source 76 (FIGURE 4) from its irradiating position in tube 59 to its storage position within the depleted uranium ball assembly 70. At the same time the other end 83 of the cable 78 travels down the tube 79 until it actuates the "IN" limit switch 81 to open the contact 81b (FIGURE 7). The voltage supply is thus disconnected from the source motor 71 which stops with the source 76 in its storage position. The contact 81a is at the same time closed.

It will be observed that when the source motor 71 moved the source from the storage to the irradiating position then the switch 81 is de-activated and therefore the normally open contact 81a opened to remove voltage from terminal 121 and thus cause the Geiger Mueller tube circuit of FIGURE 8 to be de-activated to prevent damage of the Geiger Mueller tube 116 when the main source 76 moved to its irradiating position. As soon as the inspection machine has arrived at the first weld the operator will, of course, have removed the portable radiation source and will have taken it to the second weld to be inspected. Therefore, as soon as relay R1 is de-energized, the holding contact R1–1 is opened to de-energize the time delay relay TR1 and therefore the contact TR1–1 returns to its normally closed position. Therefore relay R2 is again energized to close contacts R2–1 and R2–2 to once again supply voltage to the drive motor 36 and illuminate the drive lamp 141. The inspection machine then travels down the inside of the pipeline to the next weld at which the outside portable source is located and the sequence of operations is repeated to form an image of the weld on the external record film wrapped therearound.

As explained above, the inspection machine passes right down the length of the pipeline automatically emitting radiation from the source 76 each time it stops at a weld where the portable radiation source of FIGURES 9, 10 and 11 is located. The films having the photographic or other record of the respective weld thereon are then collected by the operator, after suitable identification, and can be examined later to determine faults in any weld.

When the inspection machine arrives at the other end of the pipeline an operator merely operates the front end switch 113 to disconnect the battery supply 110 from the circuits and the machine is rendered inoperative. The test key 60 (FIGURE 3) is tuned to lock the radiation source 76 in its storage position whilst still permitting the testing and adjusting of the machine as required. The source lamp 141 is used to indicate exposure time and adjustments may be made to the exposure time TR2 using this lamp.

The REVERSE-OFF-FORWARD switch 56 in the circuit of drive motor 36 facilitates the positioning of the unit in the pipe to be examined. The drive lamp 141 indicates when the motor circuit is energized. As will be appreciated, the circuit breaker 55 ensures protection against faults in the electrical system and also serves as a main switch.

Whilst the circuit of FIGURE 7 illustrates the use of relays and relay contacts it will be appreciated that a circuit using transistors may be designed without difficulty to perform the same functions once those functions are appreciated.

The relay R2 may be replaced by a time delay relay if required to delay activation of the drive motor and thus further protect the operator from radiation hazards.

Instead of using the transportable radiation source as illustrated in FIGURES 9, 10 and 11, the inspection machine may be constructed as shown in FIGURE 12 with a feeler wheel 192 and 193. The machine will then travel automatically down the inside of the pipeline and as soon as a weld is reached this will cause the feeler wheel 192 to trip since it is rubbing along the inside of the pipeline. This will actuate the associated micro-switch and will commence the sequence of operations described above in the same way as energization of the Geiger Mueller tube 116. There is thus no necessity for an operator to walk along the outside of the pipeline locating a portable radiation source adjacent each weld to be inspected. It is only necessary for him to wrap the films around each weld before inserting the inspection machine into the pipeline. However, it will be appreciated that with $CO_2$ welding no "stringers" are left on the inside of the pipe and therefore it may not be practical to use a feeler wheel and therefore some device similar to the portable radiation source of FIGURES 9, 10 and 11 will have to be utilized. Suitable modifications could, of course, be included so that the inspection machine stops in the correct position without the provision of the timing relay TR1 of FIGURE 7.

Although the use of electrical and electronic circuits has been described above it will be appreciated that a machine could be constructed utilizing cams mounted on a drive shaft to operate hydraulic valves in a hydraulic pressure system incorporating a small hydraulic motorized pump in conjunction with a number of jets and cylinders in which pressures will be measured by pressure gauges. When the pressures have reached a predetermined point a micro-switch will be tripped and start different actions or motors. A compressed air system may also be utilized.

The inspection machine may be adapted for use with either X-rays or gamma rays and the radiation source may, for example, be an artificial radioactive isotope such as iridium 192, cobalt 60, thulium or another isotope utilized in producing radiographs. Instead of providing the battery 2 on the inspection machine, it will be appreciated that a separate generator may be provided and inserted in the pipe together with the inspection machine.

To locate the part of the pipeline to be examined any one of the following methods may be utilized.

(1) providing a small radiation source outside the pipeline, as described above with reference to FIGURES 9, 10 and 11.
(2) a magnetic proximity method.
(3) a magnetic thickness gauging method.
(4) an ultrasonic thickness gauging method or
(5) a radiation thickness gauging method utilizing the back scatter system.

In all the methods the same principle is involved. The detector is set for nominal wall thickness of the pipe and when the detector reaches a weld which consists of a heavier weld bead or metal, or another part of a pipe to be examined, then the sequence of operations is commenced as described above. It will be appreciated that the time of exposure for the radiation source 76 is calculated according to the strength of radiation, distance and film speed to obtain a proper radiograph.

The machine which has been described is fully automatic and has no electrical cables attached to it at either end to impede its progress. There are practically no limitations to the length of pipe which can be inspected. Inspection machines have been constructed and used to inspect approximately six miles of pipeline in one operation. The size of the machine can be constructed in accordance with the diameter of pipeline to be inspected, for example, 8", 10", 12", 16" or pipes having internal diameters of 20 to 42 inches. A machine has been constructed which can operate in pipes from 16 to 42 inch diameters. In a 36" pipe approximately 70 welds per hour were inspected on a double random length pipe. On a 34" gas line one production model inspected as many as 358 welds in one working day and averaged 250 welds per day over a period, including processing, reporting and drying of film. The machine was such that it could be programmed for a 100%, 50%, 33⅓% and 25% inspection.

The versatility and speed of the described machine is believed to be a great improvement over and above the machines which are presently on the market.

The inspection machine may, of course, be provided with additional circuitry whereby if a fault develops then the additional circuitry comes into operation on a separate source of voltage supply to return the radioactive source back into its safe storage position. Also, if the radioactive source fails to come out to its irradiation position, circuitry may be provided which de-activates the machine and causes it to travel straight through and out of the pipe for attention.

I claim:

1. In apparatus for examining circumferential welds in a pipe by passing suitable radiographic rays from a source located on a travelling carriage disposed inside the body through each circumferential weld in turn to form a suitable image on a photographic film wrapped round the outside of the pipe and encircling the weld, in combination:

(1) an electric motor mounted on the carriage;
   (2) an electrical battery mounted on the carriage;
   (3) a source of radiographic rays mounted on the carriage;
   (4) mechanical driving means by which the motor can propel the carriage along the pipe;
   (5) control means arranged to control the supply of electricity from the battery to the motor;
   (6) weld detecting means carried by the carriage and effective to detect the presence of a circumferential weld as it is approached by the carriage;
   (7) the weld detecting means being arranged to actuate the control means to stop the carriage in a predetermined position relative to that weld; and
   (8) the arrangement being such that the battery remains in an upright position as the carriage passes through the pipe.

2. Apparatus as claimed in claim 1, in which the carriage includes a member which can rotate about the longitudinal axis of the pipe relative to the remainder of the carriage, and in which the mechanical driving means include wheels mounted on that member and arranged to engage the inner surface of the pipe, and the mechanical driving means also connect the motor to these wheels.

3. Apparatus as claimed in claim 2, in which the said member which can rotate relative to the carriage carries a plurality of runner legs each having an associated runner wheel arranged to facilitate movement of the carriage through the pipe, each runner extending in the same axial direction from the carriage to its wheel and the said electric motor being mounted on one of the runner legs and being adapted to drive the runner wheel associated with that leg.

4. Apparatus as claimed in claim 1, in which motive means associated with the source of radiographic rays are arranged to move the source to a position adjacent to the weld and to expose the weld to radiation from that source.

5. Apparatus as claimed in claim 4, and including a first switch operable on movement of said source from its storage position to its irradiating position and adapted to disconnect power from said source motor to thereby stop said source in its irradiating position, timing means to automatically re-connect power to said source motor at the end of a predetermined exposure time to thereby move the source from its irradiating position to its storage position, a second switch operable on movement of said source from its irradiating position to its storage position and adapted to disconnect power from said source motor to thereby stop said source in its storage position.

6. Apparatus as claimed in claim 4, in which a shield effective to stop the radiographic rays is carried by the apparatus and the said motive means associated with the source are arranged to move the source between the position adjacent to the weld and a screened position in which the source is shielded by the said shield.

7. Apparatus as claimed in claim 1, wherein an exposure tube extends axially of the pipe to a part beyond the carriage and the source of radiographic rays is positioned in the part of the exposure tube beyond the carriage during irradiation of the said weld.

8. Apparatus as claimed in claim 1, in which the weld detecting means include a feeler wheel mounted on a runner leg carried by the carriage and arranged to rotate only when it engages the weld mechanically, and a microswitch carried by the said runner leg is arranged to be actuated by said movement of the feeler wheel and is arranged when so rotated to de-energize the electric motor to stop the movement of the carriage axially of the pipe.

9. Apparatus as claimed in claim 1, in which the mechanical driving means include wheels mounted on runner arms carried by the carriage and arranged to engage the inner surface of the pipe, and the mechanical driving means connect the motor to these wheels, and these runner arms comprise a first group extending in one direction along the pipe from the carriage to their wheels and a second group extending in the opposite direction along the pipe from the carriage to their wheels.

References Cited

UNITED STATES PATENTS

| 2,181,778 | 11/1939 | Ball | 250—223 |
|---|---|---|---|
| 2,532,536 | 12/1950 | Boucher | 250—65 |
| 2,955,208 | 10/1960 | Stevens. | |
| 3,064,127 | 11/1962 | Green et al. | 250—106 |
| 3,087,058 | 4/1963 | Arvanetakis et al. | 250—52 |

RALPH G. NILSON, Primary Examiner

S. C. SHEAR, Assistant Examiner